United States Patent
Xu et al.

(10) Patent No.: US 12,531,667 B2
(45) Date of Patent: Jan. 20, 2026

(54) HYBRID AUTOMATIC REPEAT REQUEST FEEDBACK TO IMPROVE CONTROL CHANNEL PERFORMANCE

(71) Applicant: QUALCOMM Incorporated, San Diego, CA (US)

(72) Inventors: Huilin Xu, Temecula, CA (US); Liangping Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 583 days.

(21) Appl. No.: 17/657,509

(22) Filed: Mar. 31, 2022

(65) Prior Publication Data

US 2023/0318753 A1    Oct. 5, 2023

(51) Int. Cl.
*H04L 1/1829*    (2023.01)
*H04L 5/00*    (2006.01)
*H04W 24/08*    (2009.01)

(52) U.S. Cl.
CPC .......... *H04L 1/1861* (2013.01); *H04L 5/0055* (2013.01); *H04W 24/08* (2013.01)

(58) Field of Classification Search
CPC ..... H04L 1/1861; H04L 5/0055; H04W 24/08
See application file for complete search history.

(56) References Cited

U.S. PATENT DOCUMENTS

| | | | | |
|---|---|---|---|---|
| 2013/0100922 A1* | 4/2013 | Ahn | ................. | H04W 72/0446 370/329 |
| 2018/0026755 A1* | 1/2018 | Meng | ................... | H04L 1/1829 370/429 |
| 2018/0167934 A1* | 6/2018 | Seo | ........................ | H04W 72/21 |
| 2020/0059951 A1* | 2/2020 | Frenne | .............. | H04W 72/1268 |
| 2020/0100286 A1* | 3/2020 | Xu | ........................... | H04L 1/187 |
| 2020/0359403 A1* | 11/2020 | Lee | ........................ | H04W 72/21 |
| 2022/0022231 A1 | 1/2022 | Huang | | |
| 2022/0124737 A1* | 4/2022 | Huang | ................. | H04L 1/0031 |
| 2022/0151015 A1* | 5/2022 | Lu | ......................... | H04W 76/28 |
| 2022/0321303 A1* | 10/2022 | Matsumura | .......... | H04L 5/0053 |
| 2022/0322398 A1* | 10/2022 | Tsai | ...................... | H04L 1/1812 |

(Continued)

FOREIGN PATENT DOCUMENTS

WO    WO-2021027917 A1    2/2021

OTHER PUBLICATIONS

International Search Report and Written Opinion—PCT/US2023/061232—ISA/EPO—Apr. 5, 2023.

(Continued)

*Primary Examiner* — Michael Thier
*Assistant Examiner* — Tracy Lauren Raimondo
(74) *Attorney, Agent, or Firm* — Harrity & Harrity, LLP

(57) ABSTRACT

Various aspects of the present disclosure generally relate to wireless communication. In some aspects, a user equipment (UE) may generate hybrid automatic repeat request (HARQ) feedback that indicates a decoding result for a physical downlink control channel (PDCCH) transmission associated with a dynamically scheduled physical downlink shared channel (PDSCH) transmission based at least in part on HARQ-based retransmission being disabled for a HARQ process associated with the dynamically scheduled PDSCH transmission. The UE may transmit the HARQ feedback to a network node. Numerous other aspects are described.

30 Claims, 9 Drawing Sheets

(56) References Cited

U.S. PATENT DOCUMENTS

2024/0072939 A1* 2/2024 Niu ...................... H04L 5/0055

OTHER PUBLICATIONS

Moderator (ZTE) : "Summary#2 of AI 8.4.3 for HARQ in NTN", 3GPP TSG RAN WG1 #106e, R1-2108511, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 27, 2021, 76 Pages, XP052042713, p. 13 p. 18-22.

* cited by examiner

HYBRID AUTOMATIC REPEAT REQUEST FEEDBACK TO IMPROVE CONTROL CHANNEL PERFORMANCE

FIELD OF THE DISCLOSURE

Aspects of the present disclosure generally relate to wireless communication and to techniques and apparatuses for hybrid automatic repeat request (HARD) feedback to improve control channel performance.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include generating hybrid automatic repeat request (HARQ) feedback that indicates a decoding result for a physical downlink control channel (PDCCH) transmission associated with a dynamically scheduled physical downlink shared channel (PDSCH) transmission based at least in part on HARQ-based retransmission being disabled for a HARQ process associated with the dynamically scheduled PDSCH transmission. The method may include transmitting the HARQ feedback to a network node.

Some aspects described herein relate to a method of wireless communication performed by a network node. The method may include receiving, from a UE, HARQ feedback that indicates a decoding result for a PDCCH transmission associated with a dynamically scheduled PDSCH transmission based at least in part on HARQ-based retransmission being disabled for a HARQ process associated with the dynamically scheduled PDSCH transmission. The method may include adjusting a PDCCH configuration based at least in part on the HARQ feedback.

Some aspects described herein relate to a UE for wireless communication. The UE may include a memory and one or more processors coupled to the memory. The one or more processors may be configured to generate HARQ feedback that indicates a decoding result for a PDCCH transmission associated with a dynamically scheduled PDSCH transmission based at least in part on HARQ-based retransmission being disabled for a HARQ process associated with the dynamically scheduled PDSCH transmission. The one or more processors may be configured to transmit the HARQ feedback to a network node.

Some aspects described herein relate to a network node for wireless communication. The network node may include a memory and one or more processors coupled to the memory. The one or more processors may be configured to receive, from a UE, HARQ feedback that indicates a decoding result for a PDCCH transmission associated with a dynamically scheduled PDSCH transmission based at least in part on HARQ-based retransmission being disabled for a HARQ process associated with the dynamically scheduled PDSCH transmission. The one or more processors may be configured to adjust a PDCCH configuration based at least in part on the HARQ feedback.

Some aspects described herein relate to a non-transitory computer-readable medium that stores a set of instructions for wireless communication by a UE. The set of instructions, when executed by one or more processors of the UE, may cause the UE to generate HARQ feedback that indicates a decoding result for a PDCCH transmission associated with a dynamically scheduled PDSCH transmission based at least in part on HARQ-based retransmission being disabled for a HARQ process associated with the dynamically scheduled PDSCH transmission. The set of instructions, when executed by one or more processors of the UE, may cause the UE to transmit the HARQ feedback to a network node.

Some aspects described herein relate to a non-transitory computer-readable medium that stores a set of instructions for wireless communication by a network node. The set of instructions, when executed by one or more processors of the network node, may cause the network node to receive, from a UE, HARQ feedback that indicates a decoding result for a PDCCH transmission associated with a dynamically scheduled PDSCH transmission based at least in part on HARQ-based retransmission being disabled for a HARQ process associated with the dynamically scheduled PDSCH transmission. The set of instructions, when executed by one or more processors of the network node, may cause the network node to adjust a PDCCH configuration based at least in part on the HARQ feedback.

Some aspects described herein relate to an apparatus for wireless communication. The apparatus may include means for generating HARQ feedback that indicates a decoding result for a PDCCH transmission associated with a dynamically scheduled PDSCH transmission based at least in part on HARQ-based retransmission being disabled for a HARQ process associated with the dynamically scheduled PDSCH transmission. The apparatus may include means for transmitting the HARQ feedback to a network node.

Some aspects described herein relate to an apparatus for wireless communication. The apparatus may include means for receiving, from a UE, HARQ feedback that indicates a decoding result for a PDCCH transmission associated with a dynamically scheduled PDSCH transmission based at least in part on HARQ-based retransmission being disabled for a HARQ process associated with the dynamically scheduled PDSCH transmission. The apparatus may include means for adjusting a PDCCH configuration based at least in part on the HARQ feedback.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
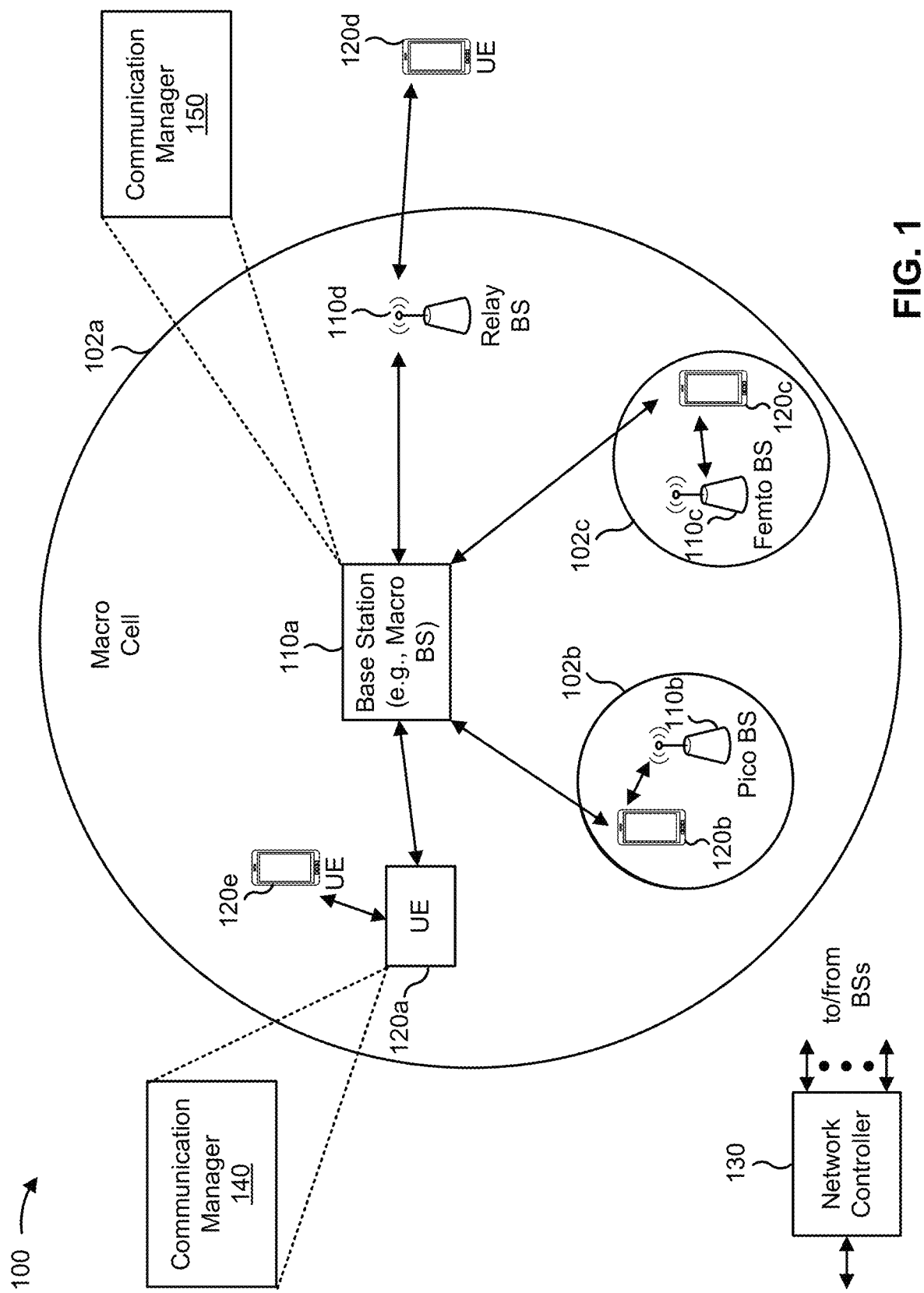
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may generate hybrid automatic repeat request (HARQ) feedback that indicates a decoding result for a physical downlink control channel (PDCCH) transmission associated with a dynamically scheduled physical downlink shared channel (PDSCH) transmission based at least in part on HARQ-based retransmission being disabled for a HARQ process associated with the dynamically scheduled PDSCH transmission; and transmit the HARQ feedback to a network node (e.g., a base station 110). Additionally, or alternatively, the communication manager 140 may perform one or more other operations described herein.

In some aspects, a network node (e.g., the base station 110) may include a communication manager 150. As described in more detail elsewhere herein, the communication manager 150 may receive, from a UE 120, HARQ feedback that indicates a decoding result for a PDCCH transmission associated with a dynamically scheduled PDSCH transmission based at least in part on HARQ-based retransmission being disabled for a HARQ process associated with the dynamically scheduled PDSCH transmission; and adjust a PDCCH configuration based at least in part on the HARQ feedback. Additionally, or alternatively, the communication manager 150 may perform one or more other operations described herein.

As indicated above, FIG. 1 is provided as an example. Other examples may differ from what is described with regard to FIG. 1.

Figure 2:
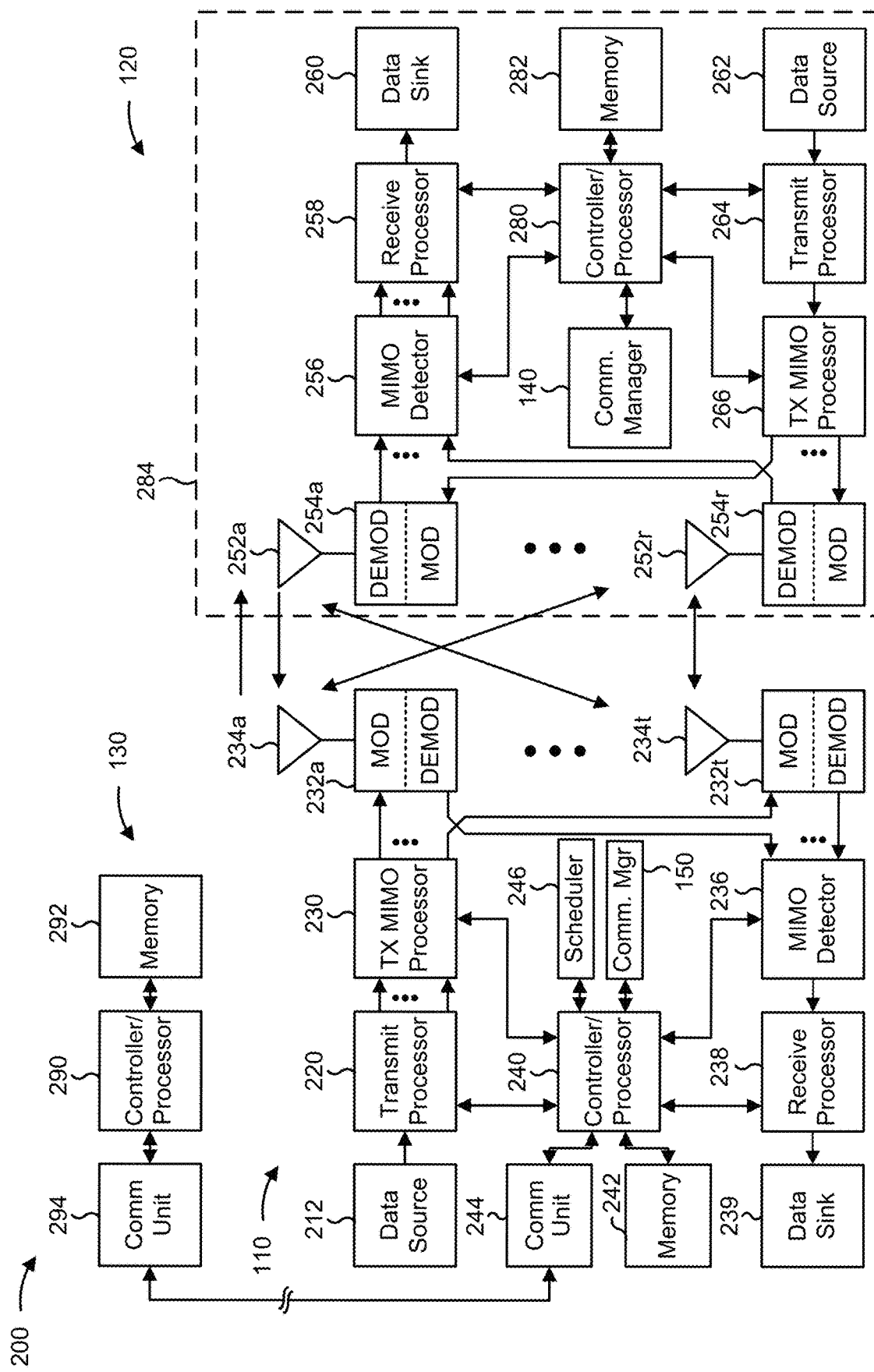
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T>1). The UE 120 may be equipped with a set of antennas 252a through 252r, such as R antennas (R>1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with HARQ feedback to improve control channel performance, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for generating HARQ feedback that indicates a decoding result for a PDCCH transmission associated with a dynamically scheduled PDSCH transmission based at least in part on HARQ-based retransmission being disabled for a HARQ process associated with the dynamically scheduled PDSCH transmission; and/or means for transmitting the HARQ feedback to a network node (e.g., the base station 110 or a component of the base station 110, such as a radio unit (RU) or a distributed unit (DU)). The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node (e.g., the base station 110 or a component of the base station 110, such as an RU or a DU) includes means for receiving, from a UE 120, HARQ feedback that indicates a decoding result for a PDCCH transmission associated with a dynamically scheduled PDSCH transmission based at least in part on HARQ-based retransmission being disabled for a HARQ process associated with the dynamically scheduled PDSCH transmission; and/or means for adjusting a PDCCH configuration based at least in part on the HARQ feedback. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
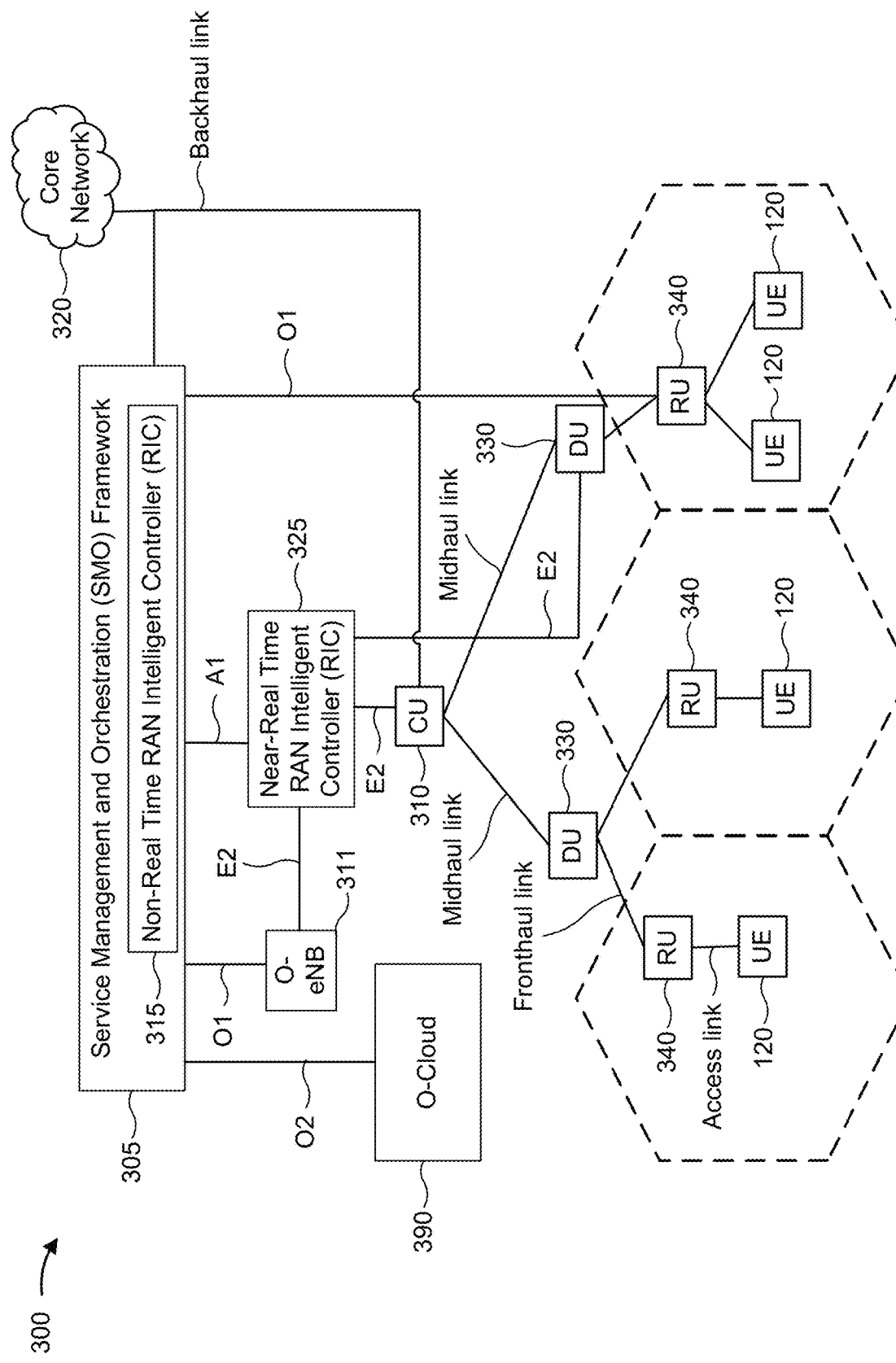
FIG. 3 is a diagram illustrating an example of a disaggregated base station architecture, in accordance with the present disclosure.

FIG. 3 is a diagram illustrating an example 300 of a disaggregated base station architecture, in accordance with the present disclosure.

The disaggregated base station architecture shown in FIG. 3 may include one or more central or centralized units (CUs) 310 that can communicate directly with a core network 320 via a backhaul link, or indirectly with the core network 320 through one or more disaggregated base station units (e.g., a Near-Real Time (Near-RT) RAN Intelligent Controller (MC) 325 via an E2 link, a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (e.g., an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit—User Plane (CU-UP)), control plane functionality (e.g., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
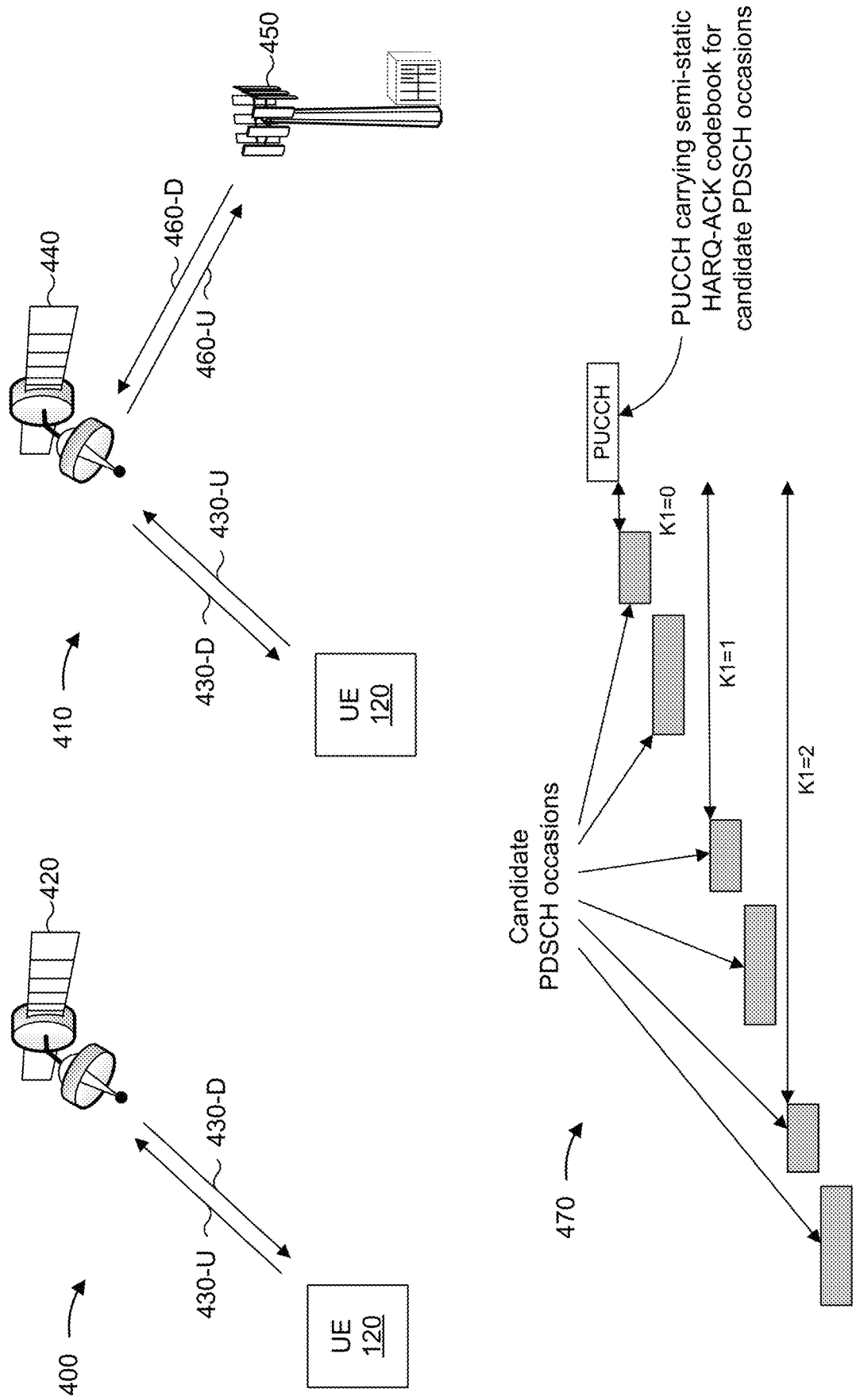
FIG. 4 is a diagram illustrating an example of a regenerative satellite deployment and an example of a transparent satellite deployment in a non-terrestrial network, in accordance with the present disclosure.

FIG. 4 is a diagram illustrating an example 400 of a regenerative satellite deployment and an example 410 of a transparent satellite deployment in a non-terrestrial network (NTN).

Example 400 shows a regenerative satellite deployment in an NTN. In example 400, a UE 120 is served by a satellite 420 via a service link 430. For example, the satellite 420 may include a base station 110 (e.g., base station 110a) and/or a gNB. The satellite 420 may be referred to as a non-terrestrial base station, a regenerative repeater, and/or an on-board processing repeater, among other examples. The satellite 420 may demodulate an uplink radio frequency (RF) signal and may modulate a baseband signal derived from the uplink RF signal to produce a downlink RF transmission. The satellite 420 may transmit the downlink RF signal to the UE 120 on the service link 430. The satellite 420 may provide a cell that covers the UE 120.

Example 410 shows a transparent satellite deployment, which may also be referred to as a bent-pipe satellite deployment. In example 410, a UE 120 is served by a satellite 440 via the service link 430. The satellite 440 may be a transparent satellite. The satellite 440 may relay a signal received from a gateway 450 (e.g., a reference point) via a feeder link 460. For example, the satellite 440 may receive an RF transmission from the gateway 450 via the feeder link 460 and may relay the RF transmission to the UE 120 via the service link 430 without demodulating the RF transmission. Additionally, or alternatively, the satellite 440 may receive an RF transmission from the UE 120 via the service link 430 and may relay the RF transmission to the gateway 450 via the feeder link 460 without demodulating the RF transmission. The satellite 440 may frequency convert the RF transmission(s) received on the service link 430 to a frequency of the RF transmission(s) on the feeder link 460 (or vice versa) and may amplify and/or filter the relayed RF transmission(s). The UEs 120 shown in example 400 and example 410 may be associated with a Global Navigation Satellite System (GNSS) capability or a Global Positioning System (GPS) capability, though not all UEs have such capabilities. The satellite 440 may provide a cell that covers the UE 120.

As shown in FIG. 4, the service link 430 may include a link between the satellite 420/440 and the UE 120, and may include one or more of an uplink or a downlink. The feeder link 460 may include a link between the satellite 440 and the gateway 450, and may include one or more of an uplink (e.g., from the UE 120 to the gateway 450 via the satellite 440) or a downlink (e.g., from the gateway 450 to the UE 120 via the satellite 440). As shown in FIG. 4, an uplink of the service link 430 is indicated by reference number 430-U and a downlink of the service link 430 is indicated by reference number 430-D. Similarly, an uplink of the feeder link 460 is indicated by reference number 460-U and a downlink of the feeder link 460 is indicated by reference number 460-D.

The feeder link 460 and the service link 430 may each experience Doppler effects due to the movement of the satellites 420 and 440, and potentially movement of a UE 120. The Doppler effects may be significantly larger than in a terrestrial network. The Doppler effect on the feeder link 460 may be compensated for to some degree, but may still be associated with some amount of uncompensated frequency error. Furthermore, the gateway 450 may be associated with a residual frequency error, and/or the satellite 420/440 may be associated with an on-board frequency error. These sources of frequency error may cause a received downlink frequency at the UE 120 to drift from a target downlink frequency. Furthermore, due to the long distance between the UE 120 and satellite 420/440, communication in an NTN may be associated with a much longer delay (e.g., a longer latency and/or a longer round-trip time (RTT)) than a delay associated with a terrestrial network. The delay may be even greater in a transparent satellite deployment because any communication between the UE 120 and the gateway 450 must travel over the service link 430 and the feeder link 460, each of which may associated with a longer delay than a terrestrial network.

In a wireless network, hybrid automatic repeat request (HARQ) feedback (sometimes referred to as HARQ acknowledgement (HARQ-ACK) feedback or the like) may be used to improve physical downlink shared channel (PDSCH) performance by enabling a UE 120 to request retransmissions and/or performing HARQ combining (sometimes referred to as soft combining or HARQ with soft combining) for a failed PDSCH transmission. For example, when HARQ feedback is enabled, a HARQ process may be associated with coded information bits (e.g., a transport block) carried in a PDSCH transmission. The HARQ process associated with the coded information bits may be indicated to the UE 120, such as in a physical downlink control channel (PDCCH) carrying a downlink grant or downlink control information (DCI) that dynamically schedules the PDSCH transmission. Accordingly, HARQ feedback is based on the UE 120 transmitting information (e.g., a HARQ-ACK report or HARQ-ACK codebook) to the network (e.g., the satellite 320/340) that indicates a decoding result associated with a PDSCH transmission such that the network may then send one or more additional replicas of the coded information bits to the UE 120 to boost PDSCH performance. For example, when HARQ feedback is enabled for a HARQ process associated with a PDSCH transmission, the UE may transmit an ACK when the transport block carried in the PDSCH transmission is successfully decoded. Otherwise, when the UE 120 experiences an error with reception and/or decoding of the PDSCH transmission, the UE 120 may transmit a negative acknowledgement (NACK) to request a retransmission. Accordingly, in cases where HARQ feedback and/or combining is supported, the UE 120 may store received data (which may include erroneously received data) in a soft buffer, and may associate the appropriate HARQ process with the soft buffer. The same HARQ process may then be used to accumulate data carried in one or more retransmissions of the PDSCH transmission such that the UE 120 can associate the data carried in the retransmission(s) with the data stored in the soft buffer (e.g., the data from the original communication and/or any prior retransmissions). In this way, the UE 120 may combine the retransmitted data with the buffered data (e.g., using soft combining or another technique to combine data from multiple transmissions), thereby improving decoding PDSCH performance.

Although HARQ feedback has the potential to significantly boost PDSCH decoding performance, PDSCH retransmission based on HARQ feedback is generally unfeasible for a failed PDSCH transmission in an NTN due to the long delay associated with satellite-based communication. For example, as described herein, satellite-based communication is subject to a long RTT, which is typically around a few milliseconds and can be up to a few tens of milliseconds. Accordingly, because PDSCH retransmission based on HARQ feedback would result in unacceptable performance for any service that has a latency requirement (e.g., voice) due to the long RTT, a UE 120 communicating in an NTN may be configured (e.g., by the satellite 320/340 and/or gateway 350) to disable retransmission based on HARQ feedback for one or more HARQ processes that are associated with PDSCH transmissions. In such cases, the NTN may configure downlink communication parameters to maintain a lower PDSCH decoding failure rate relative to a terrestrial network (e.g., by configuring a lower or more conservative MCS), and may handle PDSCH decoding failure using upper-layer mechanisms to correct decoding errors (e.g., RLC layer retransmission or upper-layer network coding). Furthermore, although the feature to disable HARQ retransmission based on HARQ feedback for one or more HARQ processes is described herein as being used in an NTN, it will be appreciated that the HARQ disabling feature is generally applicable and useful for any delay-sensitive service (e.g., extended reality) in terrestrial networks or NTNs and/or any wireless network where there may be a long RTT.

However, in cases where the network disables HARQ retransmission based on HARQ feedback for some or all HARQ processes, a UE 120 may still transmit a HARQ-ACK codebook to the network. In such cases, the UE 120 may need to determine how to construct the HARQ-ACK codebook even though the network will generally ignore the HARQ feedback carried in the HARQ-ACK codebook (e.g., whether to transmit PDSCH decoding results even though the network will not retransmit the PDSCH based on the HARQ feedback indicating that the UE 120 failed to decode the PDSCH). For example, the HARQ-ACK codebook may be a semi-static codebook (sometimes referred to as a type 1 HARQ-ACK codebook or the like) that contains HARQ feedback (e.g., an ACK or NACK) for PDSCH transmissions in all potential PDSCH occasions regardless of whether the PDSCH transmission actually occurred. For example, referring to FIG. 4, reference number 470 depicts an example of a semi-static HARQ-ACK codebook carried in a physical uplink control channel (PUCCH) transmission based on a combination of PDSCH-to-HARQ report timing offsets (e.g., K1 parameters) that define a number of slots between a scheduled PDSCH transmission and the PUCCH carrying HARQ feedback for the scheduled PDSCH. Alternatively, the HARQ-ACK codebook may be a dynamic codebook (sometimes referred to as a type 2 HARQ-ACK codebook or the like) that contains HARQ feedback only for PDSCH transmissions that have been carried out by the network. In general, the semi-static codebook type is more robust than the dynamic codebook type, and the dynamic codebook type is more compact than the semi-static codebook type.

In existing NTNs and/or terrestrial networks where a UE 120 is configured to report a semi-static (type 1) HARQ-ACK codebook and HARQ retransmission based on HARQ feedback is disabled for one or more HARQ processes, the UE 120 always reports a NACK for any HARQ processes with HARQ-based retransmission disabled regardless of the actual decoding result for the corresponding PDSCH transmission (e.g., to maintain the relative robustness of the semi-static HARQ-ACK codebook type). Furthermore, in existing NTNs and/or terrestrial networks where a UE 120 is configured to report a dynamic (type 2) HARQ-ACK codebook, the HARQ-ACK codebook only includes HARQ feedback for PDSCH transmissions that are associated with HARQ processes for which HARQ-based retransmission is enabled (e.g., the dynamic HARQ-ACK codebook does not include HARQ feedback for any PDSCH transmissions that are associated with HARQ processes for which HARQ-based retransmission is disabled). In such cases, the UE 120 increments a counter downlink assignment index (C-DAI) and a total downlink assignment index (T-DAI) included in DCI only for the HARQ processes with retransmission based on HARQ feedback enabled.

In cases where the UE 120 is configured to report a semi-static HARQ-ACK codebook, always reporting a NACK for any HARQ processes with HARQ-based retransmission disabled, regardless of the actual PDSCH decoding result, results in wasted resources with no significant benefit to the UE 120 or the network. For example, referring to FIG. 4, reference number 470 depicts an example of semi-static HARQ-ACK codebook generation for six PDSCH transmissions with three possible K1 values (e.g., 0, 1, or 2, which respectively indicate that the PUCCH carrying HARQ feedback for the corresponding PDSCH transmission is transmitted in the same slot, one slot after, or two slots after the corresponding PDSCH transmission). In a first potential scenario, the UE 120 may detect a PDCCH transmission that dynamically schedules a PDSCH transmission associated with a HARQ process for which HARQ-based retransmission is enabled, and the UE 120 may generate an ACK based on successfully decoding the dynamically scheduled PDSCH transmission. In a second potential scenario, the UE 120 may detect a scheduling PDCCH transmission and fail to successfully decode the dynamically scheduled PDSCH transmission, in which case the UE 120 may generate a NACK when the dynamically scheduled PDSCH transmission is associated with a HARQ process for which HARQ-based retransmission is enabled.

However, in other scenarios where the dynamically scheduled PDSCH transmission is associated with a HARQ process for which HARQ-based retransmission is disabled, the HARQ feedback carried in the semi-static HARQ-ACK codebook always contains a NACK and fails to differentiate among varying circumstances. In particular, for any HARQ processes for which HARQ-based retransmission is disabled, the HARQ feedback indicates a NACK in cases where the UE 120 detects the scheduling PDCCH and successfully decodes the scheduled PDSCH transmission, in cases where the UE 120 detects the scheduling PDCCH and fails to decode the scheduled PDSCH transmission, and in cases where the UE 120 fails to detect the scheduling PDCCH and therefore cannot determine whether the network transmitted the corresponding PDSCH. In the first two cases, where the UE 120 detects the scheduling PDCCH, generating a NACK regardless of the PDSCH decoding result may be acceptable for PDSCH performance because the network will not carry out a retransmission based on the HARQ feedback and the PDSCH decoding failure may be handled by the UE 120 transmitting a channel state information (CSI) report to the network to adjust the MCS used for subsequent PDSCH transmissions. However, being unable to distinguish cases where the scheduling PDCCH is detected and decoded from cases where the scheduling PDCCH is not detected or is unsuccessfully decoded wastes an opportunity to report information related to a decoding rate of the scheduling PDCCH to the network.

Accordingly, some aspects described herein relate to techniques to use HARQ feedback mechanisms to report information that relates to PDCCH decoding at a UE 120 in cases where HARQ-based retransmission is disabled for one or more HARQ processes. For example, as described in further detail herein, one or more HARQ-ACK bits that are associated with dynamically scheduled PDSCH transmissions associated with HARQ processes with HARQ-based retransmission disabled may be used to report information that relates to decoding statistics for the corresponding PDCCH that carries the scheduling DCI. In this way, the HARQ-ACK bits that are used to convey PDCCH decoding information may be used by the network to determine whether there is a need to adjust the PDCCH configuration (e.g., the network may adjust an aggregation level, or a number of resource elements that are needed to carry a DCI message) such that PDCCH decoding is almost error-free. In this way, efficiency and/or resource utilization may be increased for a semi-static HARQ-ACK codebook when HARQ-based retransmission is disabled for one or more HARQ processes by directly conveying PDCCH decoding statistics in cases where a HARQ-ACK report does not need to indicate PDSCH decoding results. In this way, disabling HARQ-based retransmission for one or more HARQ processes has a potential implementation benefit in that the UE 120 can generate the HARQ-ACK codebook before PDSCH decoding is complete. Accordingly, because the UE 120 needs to initially decode a PDCCH transmission that dynamically schedules a PDSCH transmission in order to determine whether HARQ-based retransmission is enabled or disabled for a HARQ process associated with the PDSCH, the corresponding HARQ-ACK bits may be used to indicate PDCCH decoding statistics to improve PDCCH performance, rather than always transmitting a dummy NACK. Using the HARQ-ACK bits to indicate the PDCCH decoding statistics may be especially useful in cases where non-fallback DCI having a large size is used and/or there is a large resource demand.

As indicated above, FIG. 4 is provided as an example. Other examples may differ from what is described with regard to FIG. 4.

Figure 5:
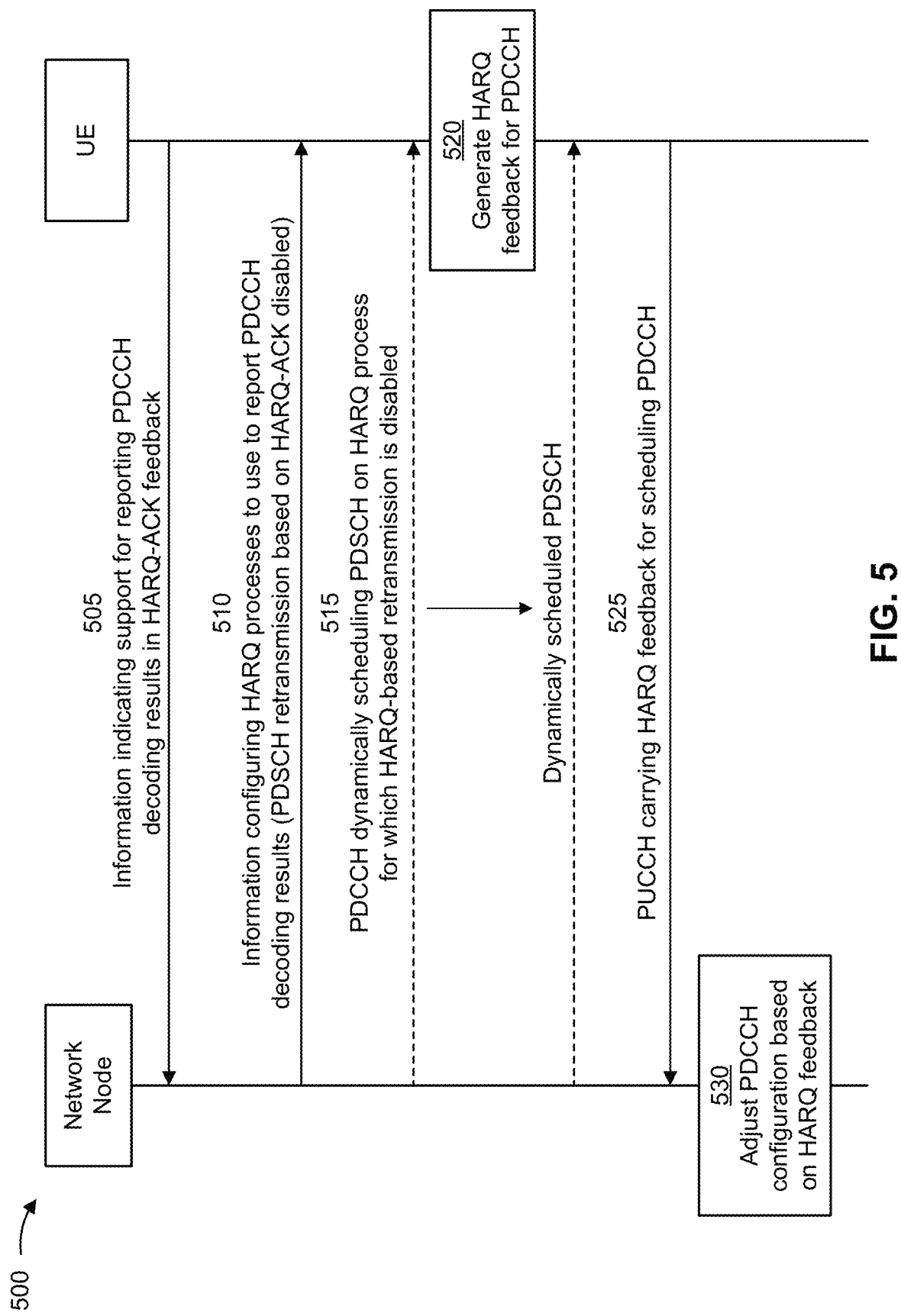
FIG. 5 is a diagram illustrating an example associated with hybrid automatic repeat request (HARQ) feedback to improve control channel performance, in accordance with the present disclosure.

FIG. 5 is a diagram illustrating an example 500 associated with HARQ feedback to improve control channel performance, in accordance with the present disclosure. As shown in FIG. 5, a network node (e.g., base station 110, CU 310, DU 330, RU 340, satellite 420, satellite 440, or the like) may communicate with a UE (e.g., UE 120). In some aspects, the network node and the UE may be part of a wireless network (e.g., an NTN or a terrestrial network). The UE and the network node may have established a wireless connection prior to operations shown in FIG. 5.

As shown in FIG. 5, and by reference number 505, the UE may transmit, and the network node may receive, information that indicates whether the UE supports reporting PDCCH decoding results in HARQ-ACK feedback. For example, the UE and the network node may communicate in a wireless network in which retransmission based on HARQ feedback may be disabled for one or more HARQ processes. For example, as described in further detail herein, the network node may support one or more HARQ-ACK codebook enhancements whereby HARQ feedback carried in a semi-static (type 1) and/or a dynamic (type 2) HARQ-ACK codebook indicates a PDCCH decoding result for one or more HARQ processes for which HARQ-based retransmission is disabled. Furthermore, in cases where a HARQ process is associated with multiple HARQ-ACK bits, the one or more HARQ-ACK codebook enhancements may enable use of the multiple HARQ-ACK bits to convey additional metrics (e.g., measurements) that are related to PDCCH quality such that the network node can use the additional metrics to adjust a PDCCH configuration. Accordingly, in some aspects, the UE may transmit, to the network node, capability signaling or UE assistance information that indicates whether the UE supports reporting PDCCH decoding results in HARQ-ACK feedback in cases where HARQ-based retransmission is disabled for one or more HARQ processes. For example, in some aspects, the capability signaling or UE assistance information may indicate whether the UE supports reporting PDCCH decoding results in HARQ-ACK feedback carried in a semi-static (type 1) HARQ-ACK codebook, whether the UE supports reporting PDCCH decoding results in HARQ-ACK feedback carried in a dynamic (type 2) HARQ-ACK codebook, whether the UE supports reporting the PDCCH decoding results using multiple HARQ-ACK bits, and/or which PDCCH decoding metrics the UE can report using multiple HARQ-ACK bits.

As further shown in FIG. 5, and by reference number 510, the network node may transmit, and the UE may receive, information that configures one or more HARQ processes for which the UE is to report PDCCH decoding results. For example, in cases where the UE indicates support for the semi-static HARQ-ACK codebook enhancement and/or the dynamic HARQ-ACK codebook enhancement, the network node may disable PDSCH retransmission based on HARQ feedback for one or more HARQ processes, and the network node may configure the UE to report PDCCH decoding results using the HARQ-ACK bit(s) associated with such HARQ processes. Furthermore, in cases where the UE supports reporting the PDCCH decoding results using multiple HARQ-ACK bits, the network node may configure the UE to report information related to PDCCH quality based on the PDCCH decoding metrics supported by the UE.

As further shown in FIG. 5, and by reference number 515, the network node may transmit a PDCCH dynamically scheduling a PDSCH on a HARQ process for which HARQ-based retransmission is disabled. Alternatively, in cases where the network node does not transmit a PDSCH in a candidate PDSCH occasion, the network node may refrain from transmitting the scheduling PDCCH. In some aspects, as shown by reference number 520, the UE may generate HARQ feedback for the scheduling PDCCH using the HARQ-ACK bits associated with the HARQ process for which HARQ-based retransmission is disabled.

For example, in cases where the UE is configured to use the semi-static HARQ-ACK codebook enhancement described herein, the UE HARQ feedback that the UE generates for the PDCCH transmission may include an ACK in cases where the UE receives the PDCCH transmission from the network node and is able to successfully decode the PDCCH transmission. Otherwise, in cases where the UE fails to detect the PDCCH transmission for a candidate PDSCH occasion or in cases where the UE attempts and fails to successfully decode the PDCCH transmission, the UE may generate a NACK for the PDCCH transmission associated with the candidate PDSCH occasion. In this way, when generating the semi-static HARQ-ACK codebook, the HARQ-ACK bits that are associated with a HARQ process for which PDSCH retransmission based on HARQ feedback is disabled may be used to indicate whether the UE was able to detect and/or decode the scheduling PDCCH. In this way, the semi-static HARQ-ACK codebook enhancement may offer improved efficiency and/or resource usage compared to existing HARQ protocols where the UE always transmits a NACK for any HARQ processes for which HARQ-based retransmission is disabled. In addition, the semi-static HARQ-ACK codebook enhancement does not add any significant implementation difficulty or complexity at the UE because the UE needs to decode the scheduling PDCCH to determine the appropriate HARQ processes (among other information) before the semi-static HARQ-ACK codebook can be generated.

Accordingly, as shown in FIG. 5, and by reference number 525, the UE may transmit, to the network node, a PUCCH transmission that carries the HARQ feedback for the PDCCH transmission. For example, in cases where the UE is configured to transmit a semi-static HARQ-ACK codebook that includes HARQ-ACK bits associated with one or more HARQ processes, the HARQ-ACK bits associated with any HARQ processes for which HARQ-based retransmission is disabled may include an ACK to indicate that the UE received and successfully decoded the scheduling PDCCH for the corresponding HARQ processes or a NACK to indicate that the UE failed to detect or failed to decode the scheduling PDCCH. In this way, for a HARQ process with HARQ-based retransmission disabled, the semi-static HARQ-ACK codebook may carry useful information to assist the network node in optimizing a PDCCH configuration. For example, as shown by reference number 530, the network node may adjust the PDCCH configuration based on the HARQ feedback that indicates the PDCCH decoding results (e.g., increasing an aggregation level if many UEs are reporting a NACK for one or more PDCCH transmissions), which may be especially useful for non-fallback DCI formats (e.g., DCI formats 1_1 and 1_2) that tend to have a large size and/or need a high aggregation level to guarantee satisfactory PDCCH decoding performance. In this way, rather than blindly configuring a large aggregation level, which is generally undesirable from a resource efficiency perspective, the semi-static HARQ-ACK codebook enhancement described herein provides a closed-loop feedback mechanism that enables the network node to accurately adjust the PDCCH aggregation level based on the PDCCH decoding results indicated in the HARQ feedback.

Alternatively, referring again to reference number 520, the UE may generate the HARQ feedback to indicate the PDCCH decoding results in cases where the UE is configured to report a dynamic (type 2) HARQ-ACK codebook for a PDCCH transmission that dynamically schedules a PDSCH transmission. For example, in cases where the UE receives a PDCCH transmission that schedules a PDSCH transmission for a HARQ process for which HARQ-based retransmission is disabled, the UE may attempt to decode the PDCCH transmission, and the HARQ feedback that the UE generates for that HARQ process may include an ACK to indicate that the PDCCH transmission was successfully decoded or a NACK to indicate that the UE failed to decode the PDCCH transmission. Furthermore, for the dynamic HARQ-ACK codebook enhancement, the UE may increment the C-DAI and the T-DAI in the scheduling PDCCH for one or more HARQ processes for which HARQ-based retransmission is disabled. In other words, when HARQ-based retransmission is disabled for one or more HARQ processes, the dynamic HARQ-ACK codebook enhancement may be used to enable HARQ-ACK reporting of PDCCH decoding results for such HARQ process(es). Furthermore, in the case of a dynamic HARQ-ACK codebook, the number of HARQ-ACK bits that are generated for a HARQ process may be the same regardless of whether HARQ-based retransmission is enabled or disabled for the dynamically scheduled PDSCH transmission (e.g., in contrast to legacy dynamic HARQ-ACK codebook configurations where the UE would transmit ACK/NACK feedback only for HARQ processes for which HARQ-based retransmission is enabled). In this way, using the HARQ-ACK bits in a dynamic HARQ-ACK codebook to report PDCCH performance statistics when HARQ-based feedback is disabled for one or more HARQ processes may similarly enable the network node to adjust the PDCCH configuration.

In some aspects, there may be cases where one or more HARQ processes are associated with more than one HARQ-ACK bit in a semi-static or dynamic HARQ-ACK codebook. For example, in some cases, multiple HARQ-ACK bits may be used to report a PDSCH decoding result for a dynamically scheduled PDSCH transmission to enable the network node to determine whether a PDSCH retransmission is needed. For example, two HARQ-ACK bits may be generated for a HARQ process associated with a PDSCH configured with two transport blocks. In another example, HARQ-ACK bits may be generated separately for each code block group (CBG) when a CBG-based HARQ retransmission mechanism is configured, multiple HARQ-ACK bits may be generated for separate carriers when a PDCCH schedules PDSCH transmissions on multiple carriers, and/or multiple HARQ-ACK bits may be generated for separate PDSCH transmissions when one PDCCH schedules multiple PDSCH transmissions on the same carrier. Accordingly, because there may be some HARQ processes where the UE has more than one HARQ-ACK bit available to transmit HARQ feedback, the additional bits may be used to convey additional (e.g., soft) information related to PDCCH quality rather than simply using one bit to indicate whether the PDCCH transmission was successfully detected and/or decoded.

For example, in some aspects, the UE may be configured to obtain one or more measurements related to the PDCCH transmission, and the multiple HARQ-ACK bits may be configured to indicate one or more metrics related to the one or more measurements. In some aspects, the multiple HARQ-ACK bits may be configured to indicate a signal-to-noise ratio (SNR) measurement obtained from a PDCCH DMRS (e.g., because the DMRS and PDCCH payload share the same beam and precoding, such that the SNR of the PDCCH DMRS also reflects the overall PDCCH quality). Additionally, or alternatively, the multiple HARQ-ACK bits may be configured to indicate a bit error rate (BER) measurement based on a set of re-encoded PDCCH information bits. For example, in cases where the UE is able to successfully decode the PDCCH, the UE may re-encode the DCI payload of the PDCCH in the same way that the DCI payload is encoded by the network node. The UE may then compare the re-encoded DCI payload with one or more soft bits (e.g., a log likelihood ratio (LLR)) that are input to a PDCCH decoder to count a mismatch between the re-encoded DCI payload and the one or more soft bits, which may indicate the BER measurement.

Furthermore, in some aspects, the UE may quantize the SNR measurement, the BER measurement, and/or other suitable measurements such that the information related to the PDCCH quality can be conveyed using the available number of HARQ-ACK bits. For example, in a use case where two HARQ-ACK bits are available to indicate the PDCCH decoding result for a HARQ process for which HARQ-based PDSCH retransmission is disabled, the two HARQ-ACK bits may have a first value (e.g., 00) to indicate that the UE failed to decode the PDCCH, a second value (e.g., 01) to indicate a first level for the PDCCH quality (e.g., the SNR, BER, or other measurement has a value in a first range), a third value (e.g., 10) to indicate a second level for the PDCCH quality (e.g., the SNR, BER, or other measurement has a value in a second range that is higher than the first range), or a fourth value (e.g., 11) to indicate a third level for the PDCCH quality (e.g., the SNR, BER, or other measurement has a value in a third range that is higher than the first and second ranges). In this way, the multiple HARQ-ACK bits may provide more granular detail to enable the network node to optimally adjust the PDCCH configuration based on the PDCCH decoding statistics and additional information related to PDCCH quality.

As indicated above, FIG. 5 is provided as an example. Other examples may differ from what is described with regard to FIG. 5.

Figure 6:
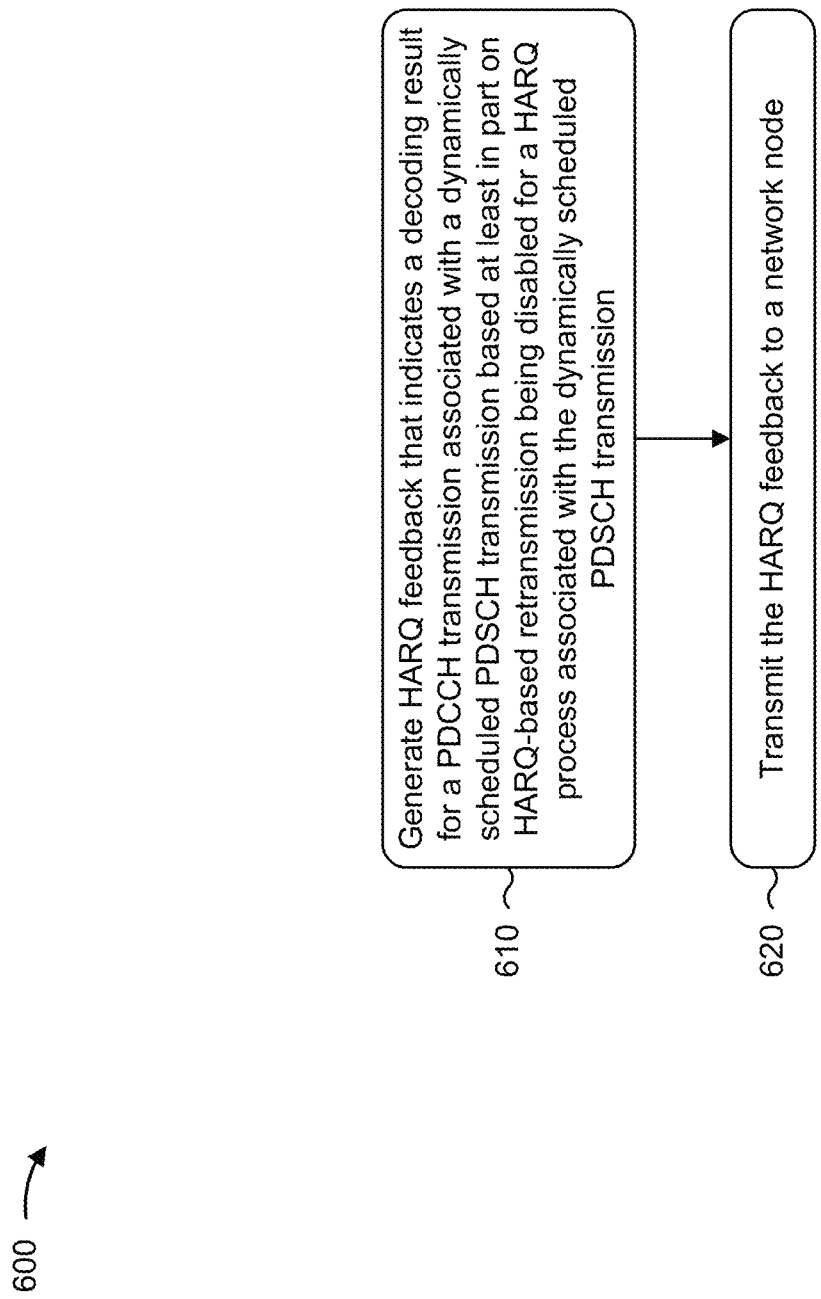
FIGS. 6-7 are diagrams illustrating example processes associated with HARQ feedback to improve control channel performance, in accordance with the present disclosure.

FIG. 6 is a diagram illustrating an example process 600 performed, for example, by a UE, in accordance with the present disclosure. Example process 600 is an example where the UE (e.g., UE 120) performs operations associated with HARQ feedback to improve control channel performance.

As shown in FIG. 6, in some aspects, process 600 may include generating HARQ feedback that indicates a decoding result for a PDCCH transmission associated with a dynamically scheduled PDSCH transmission based at least in part on HARQ-based retransmission being disabled for a HARQ process associated with the dynamically scheduled PDSCH transmission (block 610). For example, the UE (e.g., using communication manager 140 and/or HARQ feedback component 808, depicted in FIG. 8) may generate HARQ feedback that indicates a decoding result for a PDCCH transmission associated with a dynamically scheduled PDSCH transmission based at least in part on HARQ-based retransmission being disabled for a HARQ process associated with the dynamically scheduled PDSCH transmission, as described above.

As further shown in FIG. 6, in some aspects, process 600 may include transmitting the HARQ feedback to a network node (block 620). For example, the UE (e.g., using communication manager 140 and/or transmission component 804, depicted in FIG. 8) may transmit the HARQ feedback to a network node, as described above.

Process 600 may include additional aspects, such as any single aspect or any combination of aspects described below and/or in connection with one or more other processes described elsewhere herein.

In a first aspect, process 600 includes receiving, from the network node, the PDCCH transmission associated with the dynamically scheduled PDSCH transmission, and attempting to decode the PDCCH transmission, wherein the HARQ feedback transmitted to the network node includes an ACK based at least in part on successfully decoding the PDCCH transmission or a NACK based at least in part on a failure to successfully decode the PDCCH transmission.

In a second aspect, alone or in combination with the first aspect, the HARQ feedback is included in a semi-static HARQ-ACK codebook or a dynamic HARQ-ACK codebook.

In a third aspect, alone or in combination with one or more of the first and second aspects, the HARQ feedback transmitted to the network node includes a NACK based at least in part on a failure to detect the PDCCH transmission in a PDCCH occasion associated with the dynamically scheduled PDSCH transmission.

In a fourth aspect, alone or in combination with one or more of the first through third aspects, the HARQ feedback is included in a semi-static HARQ-ACK codebook.

In a fifth aspect, alone or in combination with one or more of the first through fourth aspects, the HARQ feedback includes two or more bits to indicate the decoding result for the PDCCH transmission and quality information associated with the PDCCH transmission.

In a sixth aspect, alone or in combination with one or more of the first through fifth aspects, the quality information includes an SNR or a BER associated with the PDCCH transmission.

In a seventh aspect, alone or in combination with one or more of the first through sixth aspects, process 600 includes obtaining one or more measurements related to the quality information associated with the PDCCH transmission, and quantizing the one or more measurements to convey the quality information associated with the PDCCH transmission using the two or more bits.

In an eighth aspect, alone or in combination with one or more of the first through seventh aspects, process 600 includes receiving, from the network node, information configuring the HARQ feedback to indicate the decoding result associated with the PDCCH transmission for the HARQ process associated with the dynamically scheduled PDSCH transmission.

In a ninth aspect, alone or in combination with one or more of the first through eighth aspects, process 600 includes transmitting, to the network node, information indicating support for using the HARQ feedback to indicate the decoding result associated with the PDCCH transmission.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
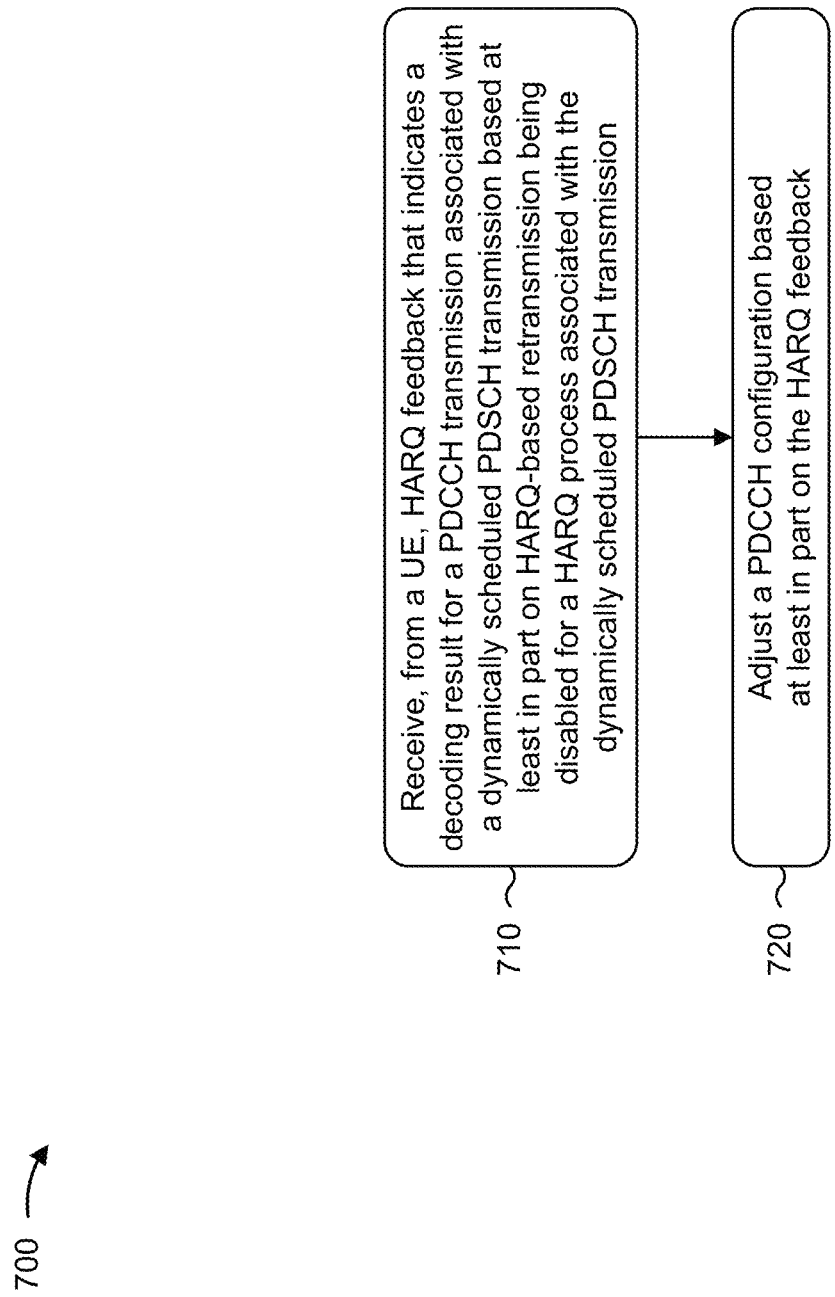

FIG. 7 is a diagram illustrating an example process 700 performed, for example, by a network node, in accordance with the present disclosure. Example process 700 is an example where the network node (e.g., base station 110, CU 310, DU 330, RU 340, satellite 420, satellite 440, or the like) performs operations associated with HARQ feedback to improve control channel performance.

As shown in FIG. 7, in some aspects, process 700 may include receiving, from a UE, HARQ feedback that indicates a decoding result for a PDCCH transmission associated with a dynamically scheduled PDSCH transmission based at least in part on HARQ-based retransmission being disabled for a HARQ process associated with the dynamically scheduled PDSCH transmission (block 710). For example, the network node (e.g., using communication manager 150 and/or reception component 902, depicted in FIG. 9) may receive, from a UE, HARQ feedback that indicates a decoding result for a PDCCH transmission associated with a dynamically scheduled PDSCH transmission based at least in part on HARQ-based retransmission being disabled for a HARQ process associated with the dynamically scheduled PDSCH transmission, as described above.

As further shown in FIG. 7, in some aspects, process 700 may include adjusting a PDCCH configuration based at least in part on the HARQ feedback (block 720). For example, the network node (e.g., using communication manager 150 and/or PDCCH configuration component 908, depicted in FIG. 9) may adjust a PDCCH configuration based at least in part on the HARQ feedback, as described above.

Process 700 may include additional aspects, such as any single aspect or any combination of aspects described below and/or in connection with one or more other processes described elsewhere herein.

In a first aspect, process 700 includes transmitting, to the UE, the PDCCH transmission associated with the dynamically scheduled PDSCH transmission, wherein the HARQ feedback includes an ACK indicating that the UE successfully decoded the PDCCH transmission or a NACK to indicate that the UE failed to successfully decode the PDCCH transmission.

In a second aspect, alone or in combination with the first aspect, the HARQ feedback is included in a semi-static HARQ-ACK codebook or a dynamic HARQ-ACK codebook.

In a third aspect, alone or in combination with one or more of the first and second aspects, the HARQ feedback includes a NACK to indicate that the UE failed to detect the PDCCH transmission in a PDCCH occasion associated with the dynamically scheduled PDSCH transmission.

In a fourth aspect, alone or in combination with one or more of the first through third aspects, the HARQ feedback is included in a semi-static HARQ-ACK codebook.

In a fifth aspect, alone or in combination with one or more of the first through fourth aspects, the HARQ feedback includes two or more bits to indicate the decoding result for the PDCCH transmission and quality information associated with the PDCCH transmission.

In a sixth aspect, alone or in combination with one or more of the first through fifth aspects, the quality information includes an SNR or a BER associated with the PDCCH transmission.

In a seventh aspect, alone or in combination with one or more of the first through sixth aspects, the two or more bits have values to quantize one or more measurements related to the quality information associated with the PDCCH transmission.

In an eighth aspect, alone or in combination with one or more of the first through seventh aspects, process 700 includes transmitting, to the UE, information configuring the HARQ feedback to indicate the decoding result associated with the PDCCH transmission for the HARQ process associated with the dynamically scheduled PDSCH transmission.

In a ninth aspect, alone or in combination with one or more of the first through eighth aspects, process 700 includes receiving, from the UE, information indicating support for using the HARQ feedback to indicate the decoding result associated with the PDCCH transmission.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
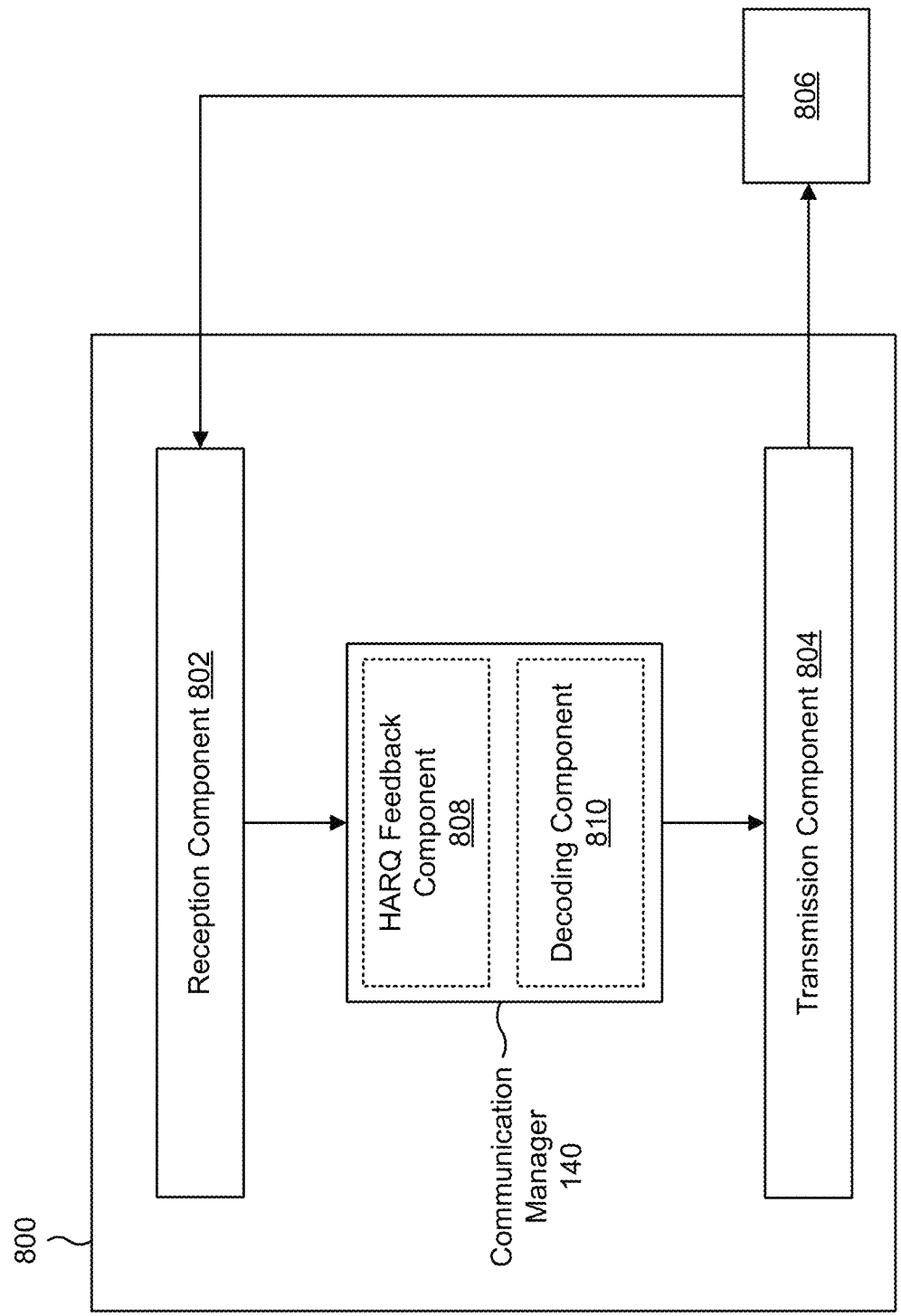
FIGS. 8-9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a HARQ feedback component 808 or a decoding component 810, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The HARQ feedback component 808 may generate HARQ feedback that indicates a decoding result for a PDCCH transmission associated with a dynamically scheduled PDSCH transmission based at least in part on HARQ-based retransmission being disabled for a HARQ process associated with the dynamically scheduled PDSCH transmission. The transmission component 804 may transmit the HARQ feedback to a network node.

The reception component 802 may receive, from the network node, the PDCCH transmission associated with the dynamically scheduled PDSCH transmission. The decoding component 810 may attempt to decode the PDCCH transmission, wherein the HARQ feedback transmitted to the network node includes an ACK based at least in part on the decoding component 810 successfully decoding the PDCCH transmission or a NACK based at least in part on the decoding component 810 failing to successfully decode the PDCCH transmission.

The HARQ feedback component 808 may obtain one or more measurements related to the quality information associated with the PDCCH transmission. The HARQ feedback component 808 may quantize the one or more measurements to convey the quality information associated with the PDCCH transmission using the two or more bits.

The reception component 802 may receive, from the network node, information configuring the HARQ feedback to indicate the decoding result associated with the PDCCH transmission for the HARQ process associated with the dynamically scheduled PDSCH transmission.

The transmission component 804 may transmit, to the network node, information indicating support for using the HARQ feedback to indicate the decoding result associated with the PDCCH transmission.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
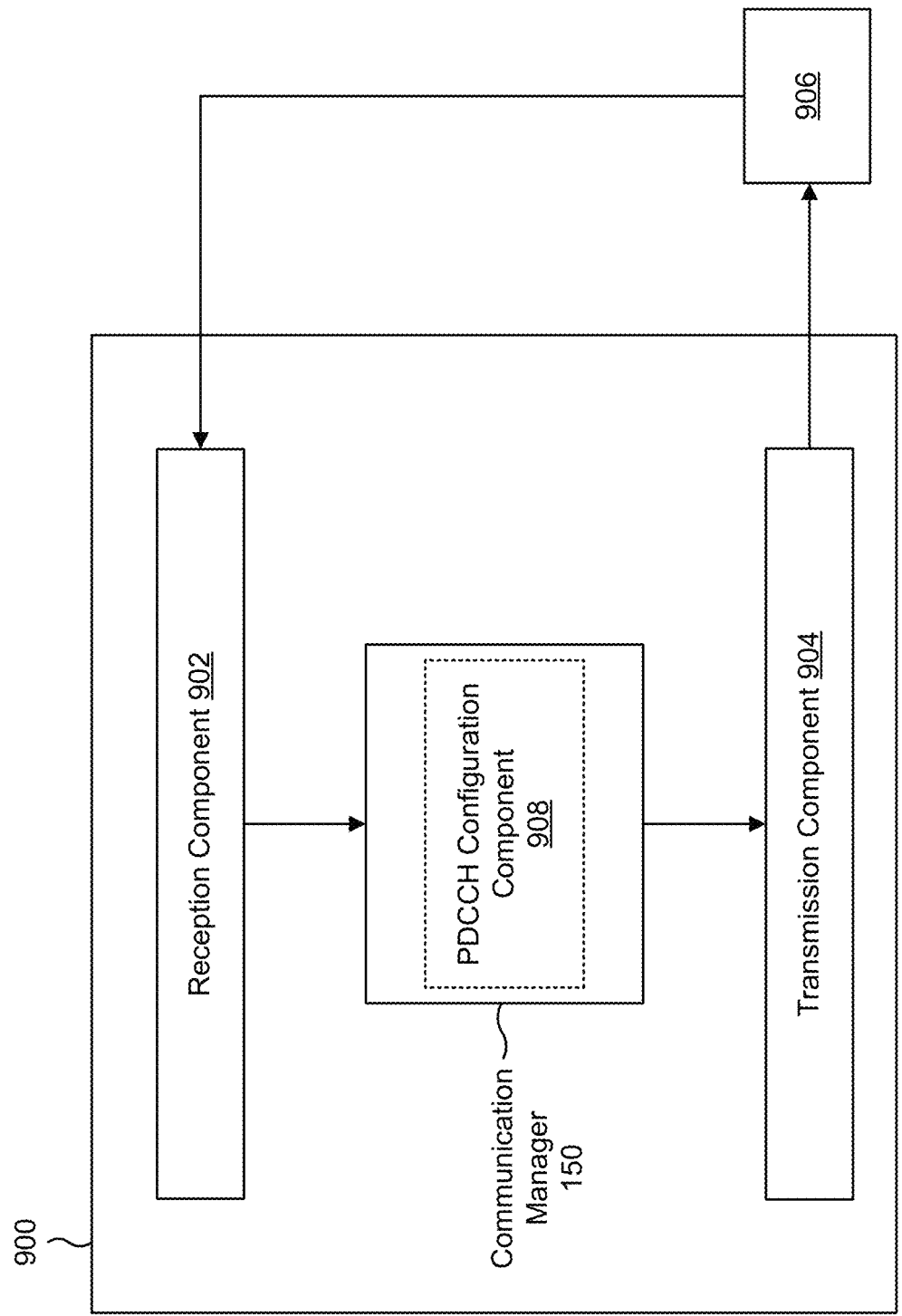

FIG. 9 is a diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a PDCCH configuration component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The reception component 902 may receive, from a UE, HARQ feedback that indicates a decoding result for a PDCCH transmission associated with a dynamically scheduled PDSCH transmission based at least in part on HARQ-based retransmission being disabled for a HARQ process associated with the dynamically scheduled PDSCH transmission. The PDCCH configuration component 908 may adjust a PDCCH configuration based at least in part on the HARQ feedback.

The transmission component 904 may transmit, to the UE, the PDCCH transmission associated with the dynamically scheduled PDSCH transmission, wherein the HARQ feedback includes an ACK indicating that the UE successfully decoded the PDCCH transmission or a NACK to indicate that the UE failed to successfully decode the PDCCH transmission.

The transmission component 904 may transmit, to the UE, information configuring the HARQ feedback to indicate the decoding result associated with the PDCCH transmission for the HARQ process associated with the dynamically scheduled PDSCH transmission.

The reception component 902 may receive, from the UE, information indicating support for using the HARQ feedback to indicate the decoding result associated with the PDCCH transmission.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: generating HARQ feedback that indicates a decoding result for a PDCCH transmission associated with a dynamically scheduled PDSCH transmission based at least in part on HARQ-based retransmission being disabled for a HARQ process associated with the dynamically scheduled PDSCH transmission; and transmitting the HARQ feedback to a network node.

Aspect 2: The method of Aspect 1, further comprising: receiving, from the network node, the PDCCH transmission associated with the dynamically scheduled PDSCH transmission; and attempting to decode the PDCCH transmission, wherein the HARQ feedback transmitted to the network node includes an ACK based at least in part on successfully decoding the PDCCH transmission or a NACK based at least in part on a failure to successfully decode the PDCCH transmission.

Aspect 3: The method of Aspect 2, wherein the HARQ feedback is included in a semi-static HARQ-ACK codebook or a dynamic HARQ-ACK codebook.

Aspect 4: The method of Aspect 1, wherein the HARQ feedback transmitted to the network node includes a NACK based at least in part on a failure to detect the PDCCH transmission in a PDCCH occasion associated with the dynamically scheduled PDSCH transmission.

Aspect 5: The method of Aspect 4, wherein the HARQ feedback is included in a semi-static HARQ-ACK codebook.

Aspect 6: The method of any of Aspects 1-5, wherein the HARQ feedback includes two or more bits to indicate the decoding result for the PDCCH transmission and quality information associated with the PDCCH transmission.

Aspect 7: The method of Aspect 6, wherein the quality information includes an SNR or a BER associated with the PDCCH transmission.

Aspect 8: The method of any of Aspects 6-7, further comprising: obtaining one or more measurements related to the quality information associated with the PDCCH transmission; and quantizing the one or more measurements to convey the quality information associated with the PDCCH transmission using the two or more bits.

Aspect 9: The method of any of Aspects 1-8, further comprising: receiving, from the network node, information configuring the HARQ feedback to indicate the decoding result associated with the PDCCH transmission for the HARQ process associated with the dynamically scheduled PDSCH transmission.

Aspect 10: The method of any of Aspects 1-9, further comprising: transmitting, to the network node, information indicating support for using the HARQ feedback to indicate the decoding result associated with the PDCCH transmission.

Aspect 11: A method of wireless communication performed by a network node, comprising: receiving, from a UE, HARQ feedback that indicates a decoding result for a PDCCH transmission associated with a dynamically scheduled PDSCH transmission based at least in part on HARQ-based retransmission being disabled for a HARQ process associated with the dynamically scheduled PDSCH transmission; and adjusting a PDCCH configuration based at least in part on the HARQ feedback.

Aspect 12: The method of Aspect 11, further comprising: transmitting, to the UE, the PDCCH transmission associated with the dynamically scheduled PDSCH transmission, wherein the HARQ feedback includes an ACK indicating that the UE successfully decoded the PDCCH transmission or a NACK to indicate that the UE failed to successfully decode the PDCCH transmission.

Aspect 13: The method of Aspect 12, wherein the HARQ feedback is included in a semi-static HARQ-ACK codebook or a dynamic HARQ-ACK codebook.

Aspect 14: The method of Aspect 11, wherein the HARQ feedback includes a NACK to indicate that the UE failed to detect the PDCCH transmission in a PDCCH occasion associated with the dynamically scheduled PDSCH transmission.

Aspect 15: The method of Aspect 14, wherein the HARQ feedback is included in a semi-static HARQ-ACK codebook.

Aspect 16: The method of any of Aspects 11-15, wherein the HARQ feedback includes two or more bits to indicate the decoding result for the PDCCH transmission and quality information associated with the PDCCH transmission.

Aspect 17: The method of Aspect 16, wherein the quality information includes an SNR or a BER associated with the PDCCH transmission.

Aspect 18: The method of any of Aspects 16-17, wherein the two or more bits have values to quantize one or more measurements related to the quality information associated with the PDCCH transmission.

Aspect 19: The method of any of Aspects 11-18, further comprising: transmitting, to the UE, information configuring the HARQ feedback to indicate the decoding result associated with the PDCCH transmission for the HARQ process associated with the dynamically scheduled PDSCH transmission.

Aspect 20: The method of any of Aspects 11-19, further comprising: receiving, from the UE, information indicating support for using the HARQ feedback to indicate the decoding result associated with the PDCCH transmission.

Aspect 21: An apparatus for wireless communication at a device, comprising a processor; memory coupled with the processor; and instructions stored in the memory and executable by the processor to cause the apparatus to perform the method of one or more of Aspects 1-10.

Aspect 22: A device for wireless communication, comprising a memory and one or more processors coupled to the memory, the one or more processors configured to perform the method of one or more of Aspects 1-10.

Aspect 23: An apparatus for wireless communication, comprising at least one means for performing the method of one or more of Aspects 1-10.

Aspect 24: A non-transitory computer-readable medium storing code for wireless communication, the code comprising instructions executable by a processor to perform the method of one or more of Aspects 1-10.

Aspect 25: A non-transitory computer-readable medium storing a set of instructions for wireless communication, the set of instructions comprising one or more instructions that, when executed by one or more processors of a device, cause the device to perform the method of one or more of Aspects 1-10.

Aspect 26: An apparatus for wireless communication at a device, comprising a processor; memory coupled with the processor; and instructions stored in the memory and executable by the processor to cause the apparatus to perform the method of one or more of Aspects 11-20.

Aspect 27: A device for wireless communication, comprising a memory and one or more processors coupled to the memory, the one or more processors configured to perform the method of one or more of Aspects 11-20.

Aspect 28: An apparatus for wireless communication, comprising at least one means for performing the method of one or more of Aspects 11-20.

Aspect 29: A non-transitory computer-readable medium storing code for wireless communication, the code comprising instructions executable by a processor to perform the method of one or more of Aspects 11-20.

Aspect 30: A non-transitory computer-readable medium storing a set of instructions for wireless communication, the set of instructions comprising one or more instructions that, when executed by one or more processors of a device, cause the device to perform the method of one or more of Aspects 11-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   generating hybrid automatic repeat request (HARQ) feedback that indicates a decoding result for a physical downlink control channel (PDCCH) transmission associated with a dynamically scheduled physical downlink shared channel (PDSCH) transmission based at least in part on HARQ-based retransmission being disabled for a HARQ process associated with the dynamically scheduled PDSCH transmission;
   transmitting, to a network node, capability signaling that indicates whether the UE supports reporting the decoding result for the PDCCH transmission using multiple HARQ bits;
   quantizing one or more measurements to convey quality information associated with the PDCCH transmission using two or more bits, wherein the one or more measurements comprise a signal-to-noise ratio (SNR)

measurement obtained from a PDCCH demodulation reference signal (DMRS) that shares a same beam as the PDCCH transmission; and transmitting the HARQ feedback to the network node, wherein the HARQ feedback includes the two or more bits to indicate the decoding result for the PDCCH transmission and the quality information.

2. The method of claim 1, further comprising:
receiving, from the network node, the PDCCH transmission; and
attempting to decode the PDCCH transmission, wherein the HARQ feedback transmitted to the network node includes an acknowledgement (ACK) based at least in part on successfully decoding the PDCCH transmission or a negative acknowledgement (NACK) based at least in part on a failure to successfully decode the PDCCH transmission.

3. The method of claim 2, wherein the HARQ feedback is included in a semi-static HARQ-ACK codebook or a dynamic HARQ-ACK codebook.

4. The method of claim 1, wherein the HARQ feedback transmitted to the network node includes a negative acknowledgement (NACK) based at least in part on a failure to detect the PDCCH transmission in a PDCCH occasion associated with the dynamically scheduled PDSCH transmission.

5. The method of claim 4, wherein the HARQ feedback is included in a semi-static HARQ-ACK codebook.

6. The method of claim 1, wherein the two or more bits indicate a bit error rate associated with the PDCCH transmission.

7. The method of claim 1, further comprising:
obtaining the one or more measurements, wherein the one or more measurements are related to the quality information.

8. The method of claim 1, further comprising:
receiving, from the network node, information configuring the HARQ feedback to indicate the decoding result for the PDCCH transmission.

9. The method of claim 1, wherein the multiple HARQ bits comprise multiple HARQ acknowledgement (HARQ-ACK) bits.

10. The method of claim 1, wherein the capability signaling indicates whether the UE supports reporting the decoding result for the PDCCH transmission using the multiple HARQ bits and indicates which PDCCH decoding metrics the UE can report using the multiple HARQ bits.

11. A method of wireless communication performed by a network node, comprising:
receiving, from a user equipment (UE), capability signaling that indicates whether the UE supports reporting a decoding result for a physical downlink control channel (PDCCH) transmission using multiple hybrid automatic repeat request (HARQ) bits;
receiving, from the UE, HARQ feedback that indicates the decoding result for the PDCCH transmission based at least in part on HARQ-based retransmission being disabled for a HARQ process associated with a dynamically scheduled physical downlink shared channel (PDSCH) transmission, the PDCCH transmission associated with the dynamically scheduled PDSCH transmission, wherein the HARQ feedback includes two or more bits to indicate quality information associated with the PDCCH transmission, wherein the quality information comprises a signal-to-noise ratio (SNR) measurement obtained from a PDCCH demodulation reference signal (DMRS) that shares a same beam as the PDCCH transmission, and wherein the two or more bits have values to quantize one or more measurements, the one or more measurements comprising the SNR measurement; and
adjusting a PDCCH configuration based at least in part on the HARQ feedback.

12. The method of claim 11, further comprising:
transmitting, to the UE, the PDCCH transmission, wherein the HARQ feedback includes an acknowledgement (ACK) indicating that the UE successfully decoded the PDCCH transmission or a negative acknowledgement (NACK) to indicate that the UE failed to successfully decode the PDCCH transmission.

13. The method of claim 12, wherein the HARQ feedback is included in a semi-static HARQ-ACK codebook or a dynamic HARQ-ACK codebook.

14. The method of claim 11, wherein the HARQ feedback includes a negative acknowledgement (NACK) to indicate that the UE failed to detect the PDCCH transmission in a PDCCH occasion associated with the dynamically scheduled PDSCH transmission.

15. The method of claim 14, wherein the HARQ feedback is included in a semi-static HARQ-ACK codebook.

16. The method of claim 11, wherein the two or more bits indicate the decoding result for the PDCCH transmission and the quality information associated with the PDCCH transmission.

17. The method of claim 16, wherein the two or more bits indicate a bit error rate associated with the PDCCH transmission.

18. The method of claim 16, wherein the one or more measurements are related to the quality information associated with the PDCCH transmission.

19. The method of claim 11, further comprising:
transmitting, to the UE, information configuring the HARQ feedback to indicate the decoding result for the PDCCH transmission.

20. The method of claim 11, wherein the multiple HARQ bits comprise multiple HARQ acknowledgement (HARQ-ACK) bits.

21. A user equipment (UE) for wireless communication, comprising:
one or more memories; and
one or more processors, coupled to the one or more memories, configured to:
generate hybrid automatic repeat request (HARQ) feedback that indicates a decoding result for a physical downlink control channel (PDCCH) transmission associated with a dynamically scheduled physical downlink shared channel (PDSCH) transmission based at least in part on HARQ-based retransmission being disabled for a HARQ process associated with the dynamically scheduled PDSCH transmission;
transmit, to a network node, capability signaling that indicates whether the UE supports reporting the decoding result for the PDCCH transmission using multiple HARQ bits;
quantize one or more measurements to convey quality information associated with the PDCCH transmission using two or more bits, wherein the one or more measurements comprise a signal-to-noise ration (SNR) measurement obtained from a PDCCH demodulation reference signal (DMRS) that shares a same beam as the PDCCH transmission; and
transmit the HARQ feedback to the network node, wherein the HARQ feedback includes the two or more bits to indicate the decoding result for the PDCCH transmission and the quality information.

22. The UE of claim 21, wherein the one or more processors are further configured to:
receive, from the network node, the PDCCH transmission; and
attempt to decode the PDCCH transmission, wherein the HARQ feedback transmitted to the network node includes an acknowledgement (ACK) based at least in part on successfully decoding the PDCCH transmission or a negative acknowledgement (NACK) based at least in part on a failure to successfully decode the PDCCH transmission.

23. The UE of claim 21, wherein the HARQ feedback transmitted to the network node includes a negative acknowledgement (NACK) based at least in part on a failure to detect the PDCCH transmission in a PDCCH occasion associated with the dynamically scheduled PDSCH transmission.

24. The UE of claim 21, wherein the multiple HARQ bits comprise multiple HARQ acknowledgement (HARQ-ACK) bits.

25. A network node for wireless communication, comprising:
on or more memories; and
one or more processors, coupled to the one or more memories, configured to:
receive, from a user equipment (UE), capability signaling that indicates whether the UE supports reporting a decoding result for a physical downlink control channel (PDCCH) transmission using multiple hybrid automatic repeat request (HARQ) bits;
receive, from the UE, HARQ feedback that indicates the decoding result for the PDCCH transmission based at least in part on HARQ-based retransmission being disabled for a HARQ process associated with a dynamically scheduled PDSCH transmission, the PDCCH transmission associated with the dynamically scheduled PDSCH transmission, wherein the HARQ feedback includes two or more bits to indicate quality information associated with the PDCCH transmission, wherein the quality information comprises a signal-to-noise ratio (SNR) measurement obtained from a PDCCH demodulation reference signal (DMRS) that shares a same beam as the PDCCH transmission, and wherein the two or more bits have values to quantize one or more measurements, the one or more measurements comprising the SNR measurement; and
adjust a PDCCH configuration based at least in part on the HARQ feedback.

26. The network node of claim 25, wherein the one or more processors are further configured to:
transmit, to the UE, the PDCCH transmission, wherein the HARQ feedback includes an acknowledgement (ACK) indicating that the UE successfully decoded the PDCCH transmission or a negative acknowledgement (NACK) to indicate that the UE failed to successfully decode the PDCCH transmission.

27. The network node of claim 25, wherein the HARQ feedback includes a negative acknowledgement (NACK) to indicate that the UE failed to detect the PDCCH transmission in a PDCCH occasion associated with the dynamically scheduled PDSCH transmission.

28. The network node of claim 25, wherein the two or more bits indicate the decoding result for the PDCCH transmission and the quality information associated with the PDCCH transmission.

29. The network node of claim 25, wherein the one or more processors are further configured to:
transmit, to the UE, information configuring the HARQ feedback to indicate the decoding result for the PDCCH transmission.

30. The network node of claim 25, wherein the HARQ feedback is included in a semi-static HARQ-ACK codebook or a dynamic HARQ-ACK codebook.

* * * * *